United States Patent [19]
Abe et al.

[11] 3,940,788
[45] Feb. 24, 1976

[54] COLOR TELEVISION CAMERA OPTICAL SYSTEM

[75] Inventors: Haruo Abe; Masaichiro Konishi; Teruo Hosokawa, all of Sakai, Japan

[73] Assignee: Minolta Camera Kabushiki Kaisha, Osaka, Japan

[22] Filed: Dec. 6, 1973

[21] Appl. No.: 422,237

[30] Foreign Application Priority Data
Jan. 16, 1973 Japan.................................. 48-6588

[52] U.S. Cl..................................... 358/43; 358/55
[51] Int. Cl.² ............................................ H04N 9/07
[58] Field of Search ..................... 358/55, 43, 5, 44; 350/162 SF, 317

[56] References Cited
UNITED STATES PATENTS

| | | | |
|---|---|---|---|
| 2,733,291 | 1/1956 | Kell................................... | 358/55 X |
| 3,588,326 | 6/1971 | Frohbach.......................... | 358/55 X |
| 3,756,695 | 9/1973 | Mino et al. ....................... | 358/55 X |
| 3,757,033 | 9/1973 | Frohback et al.................. | 358/55 X |
| 3,768,888 | 10/1973 | Nishino et al...................... | 358/47 X |
| 3,821,795 | 6/1974 | Okano ................................. | 358/47 |

*Primary Examiner*—Robert L. Griffin
*Assistant Examiner*—Mitchell Saffian
*Attorney, Agent, or Firm*—Wolder & Gross

[57] ABSTRACT

An optical system in a single or double tube color television camera for minimizing color shading, moire patterns and color beats includes along the image optical axis a phase grating low pass filter, a color encoding filter and a lenticular lens member oriented relative to each other and the image scanning to minimize interference between the color encoding filter and striped patterns in the viewed object. The color encoding filter is striped, the low pass filter is either striped or has regularly longitudinally and transversely spaced phase retarding projections and the lenticular lens member includes transversely spaced longitudinal cylindrical lenses or regularly transversely and longitudinally spaced convex projections.

2 Claims, 9 Drawing Figures

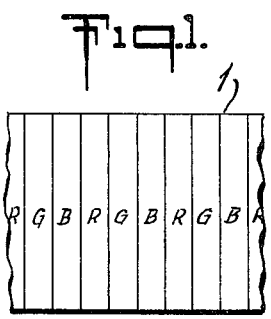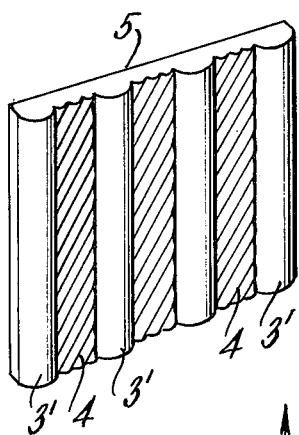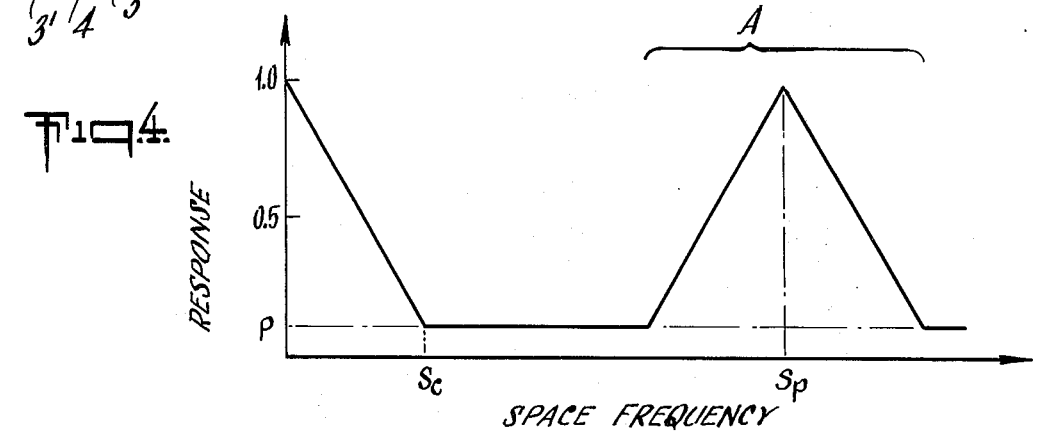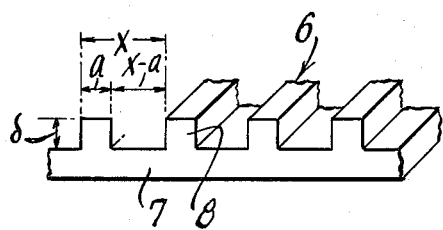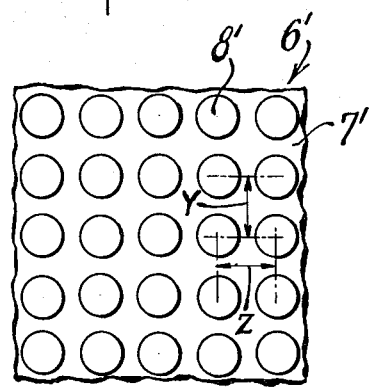

COLOR TELEVISION CAMERA OPTICAL SYSTEM

The present invention relates generally to improvements in single or double tube type color television cameras and it relates more particularly to an improved optical system for such camera systems for preventing color shading, moire patterns, color interference blots and similar aberrations and distortions.

In the image forming optical system of a single or double tube type color television camera system, there is generally provided a color stripe filter to correspondingly spatially color modulate the image whereby to generate respective chrominance signals for the separate colors.

With the use of such a stripe filter, if there is a stripe type pattern in the viewed object having a spatial frequency close to that of the aforesaid stripe filter, then there occurs interference with the stripe filter, thereby causing a beat in the chrominance signal with consequent color distortion or shading on the television screen.

To avoid such a phenomenon, there is commonly provided in the camera optical system an optical filter, such as, for example, a low-pass filter to block or sharply attenuate any image signal having a frequency higher than that of the stripe filter, or a space frequency filter.

As is disclosed in Japanese Patent Publication N. 1155/1969, a polyhedron prism may be provided as an optical filter in the pupil plane of an optical system, or one in which a double refractive member is used. However, such optical filters possess great difficulties in manufacture in addition to the limitation in the design of the optical system itself due to the restrictive limitations in the location of the filter in the optical system.

In contrast, the inventor has discovered great advantages in the use of a low-pass filter utilizing a phase grating as an optical low-pass filter as described in U.S. Pat. No. 3,756,695 granted Sept. 4, 1973. The systems disclosed in the above patent include an optical low-pass filter, wherein there is provided a rectangular wave phase grating giving a phase difference $\delta$ to the wave surfaces or spots and having identical shapes and sizes and arranged whereby the relationship of the portion giving a phase difference or retardation, to the portion giving no phase difference or retardation, is maintained at a given area ratio. Such an optical low-pass filter has the advantages that it is of simple manufacture, is applicable to mass production, there is no limitation to the location thereof in the optical system and it may be formed on a lens surface in the lens system, except for insufficient space frequency characteristics.

It has been previously proposed to focus the image of the color encoding stripe filter on the image chrominance tube in a single or double tube type color television camera system, a lenticular lens member being used for such purpose or such lenses are arranged to present cylindrical lens screen having their longitudinal axes arranged to parallel to each other, thereby rendering compact the full lens system. A lenticular lens member consisting of such cylindrical lens screens has some capability of cutting high frequency components, itself, such that it has been proposed to utilize part of such a lenticular lens member for an optical filter in place of a stripe filter, (Japanese Patent Publication No. 27418/1970). However, such a lenticular lens member fails to provide a characteristic capable of attenuation in the frequency zone determined by the stripe filter, and possesses the great disadvantage of developing considerable noise, thereby failing to provide a satisfactory optical filter.

The present invention is directed to avoiding the aforesaid disadvantages and to completely eliminating the interference of a stripe pattern of an object with a color encoding stripe filter, by providing in the camera lens system having a color encoding stripe filter the combination of a phase grating with an optical body having a lenticular lens system arranged so as to have orientation characteristics relative to each other, thereby presenting a device adapted for use in preventing color shading or distortion in a color television system. It has been discovered that the frequency response of the combination of the phase grating low-pass filter and the lenticular lens member when used as above, is far superior to either of these individually and is not normally expected.

The above and other features and advantages of the present invention will be clear from a reading of the following description taken in conjunction with the following drawings which illustrate a preferred embodiment thereof, wherein:

FIG. 1 is a plan view of one form of a color encoding stripe filter for use in the camera of a color television system;

FIG. 2 is a perspective view of an optical body having a lenticular lens system consisting of convex ridges arranged in parallel to each other;

FIG. 3 is a perspective view of an optical body of the prior art, incorporating the characteristics of a low-pass filter in addition to those of a lenticular lens;

FIG. 4 is a plot showing the space frequency characteristics of the response of a phase plate low-pass filter used in the present system;

FIG. 5(A) is a perspective view of one form of rectangular wave phase plate filter for use in the present system and having phase-difference defining stop portions arranged in parallel to each other;

FIG. 5(B) is a plan view of a phase plate which may be employed in the present system consisting of small circular phase-difference portions arranged so as to provide orientation characteristics;

Figure 6:
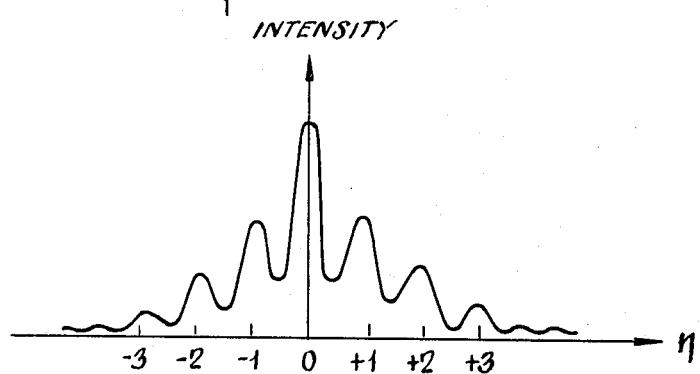
FIG. 6 is a plot showing the intensity characteristics of the phase plate shown in FIG. 5(A)
Figure 7:
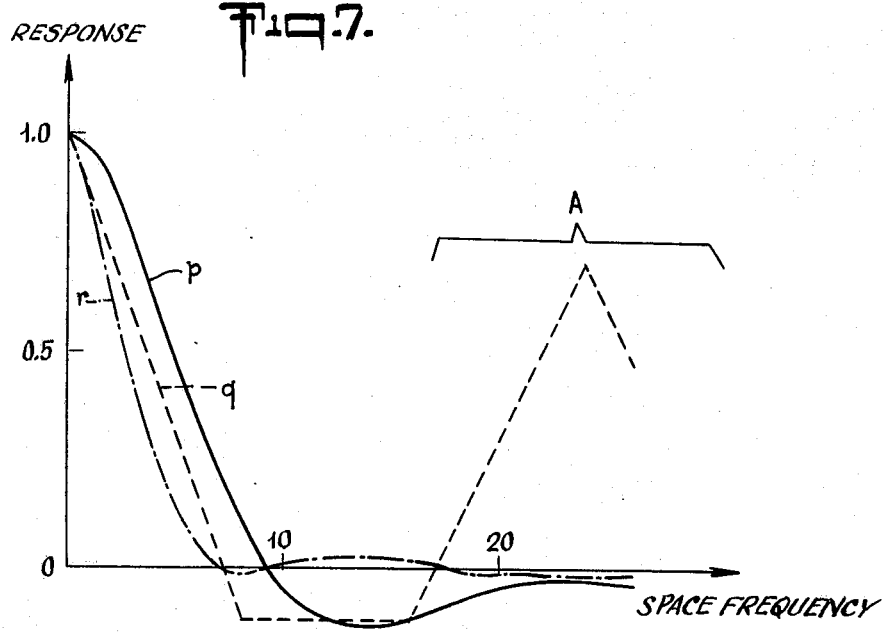
Figure 8:
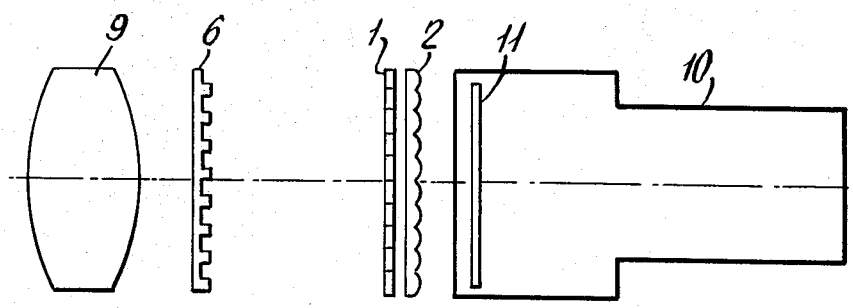

FIG. 7 is a plot showing the response characteristic (p) to the space frequency of the optical body having a lenticular lens system having orientation characteristics, the response characteristic (q) to the space frequency of the phase plate low-pass system and the overall characteristic (r) of the combination of both; and FIG. 8 is a diagram showing the entire arrangement of one embodiment of the present invention.

Referring now to the drawings which illustrate preferred embodiments of the present invention, the reference numeral 1 generally designates a color encoding stripe filter used in a single or double tube type color television camera system such as is shown in FIG. 8, the filter 1 functioning to resolve the color of an image from an object and located in an optical system in front of the image tube which detects and produces chrominance signals. The stripe filter 1 comprises a stripe-like grating whose segments are arranged parallel to each other, the grating being provided with segments consisting of red R, green G and blue B portions in this order. The light from a photographic object is focussed by the focussing lens 9 on a photo-responsive or photoelectric converting face 11 of an image tube, while the image through the stripe filter 1 is focussed on the photoelectric converting face by another lens, for obtaining chrominance signals. This lens is a lenticular lens member consisting of a plurality of lens bodies, the radius of curvature of the lenses being small to shorten or compress the distance between the stripe filter 1 and the photoelectric converting face 11. Such a lenticular lens member may be formed by conventional molding techniques. Due to the finishing accuracy of the mold-forming, the split pitch in the lenticular lens member consisting of a plurality of lenses should not be too small, so as not to impair the brightness of the image given through the stripe filter 1. The lenticular lens member of this kind may be an optical body of the screen type having continuous projections thereon, said body consisting of a plurality of lenses having predetermined orientation characteristics, or a lenticular lens member 2 consisting of parallel convex ridges or lenses, in which cylindrical lenses 3 are disposed with their axes in parallel as shown in FIG. 2.

If a color encoding grating type stripe filter 1 is used in the optical system, and if there is a stripe pattern in an image of the object, which pattern has a frequency the same as or close to that of the stripe filter 1, or if there is a stripe pattern having a frequency higher than that of the stripe filter 1, then interference occurs between the stripe pattern and stripe filter, a beat is produced which causes false signals in the chrominance signal with the resultant color shading and distortion on the image obtained. To avoid such drawbacks, it is necessary to eliminate or strongly attenuate from the image frequencies higher than the frequency of the stripe filter 1. This in turn leads to the necessity of providing an optical filter such as a low-pass filter in the aforesaid optical system.

Although the lenticular lens member 2 having the aforesaid orientation characteristics incidentally functions as a low-pass filter, it is primarily intended to focus on the photoelectric face of the camera tube 10 the image effected through the aforesaid stripe filter 1. In this respect, the position of the lenticular lens member 2 in the lens system and the radius of curvatures of the respective lens elements 3 are governed thereby, and furthermore the pitch is also so governed, considering the capabilities of mold-forming techniques. Thus, by reason of the above factors the desired performances for the low-pass filter are not achieved.

Referring now to FIG. 3, there is shown a low-pass filter as disclosed in patent Japanese Patent Publication No. 27418/1970, in which the parallel convex lens ridges 3' are spaced from each other distances to impart to the lenticular lens member the functions of a low-pass filter, the ridges 3' serving as non-lens portions, and lens portions 4 of a smaller radius of curvature are provided there between. Such a low-pass filter not only presents difficulties in its highly accurate manufacturing, but also disturbs the light from the stripe filter 1, with the result that the image from the respective lenticular lens member 5 of the stripe filter 1 is impaired, thus failing to present a chrominance signal of a suitably high accuracy.

According to the present invention, the focussing capability of the lenticular lens member is retained intact, and the image of the stripe pattern of an object having a frequency higher than that of the stripe filter is sharply attenuated or blocked, by supplementing the insufficient function as an optical filter presented by the lenticular lens member with the function of the optical filter presented by a low-pass phase grating.

FIG. 5(A) shows a rectangular wave grating 6 which is a component of one embodiment of the present invention, in which there are provided on a base plate 7 phase-difference defining or retarding portions 8 extending parallel to each other and producing a phase difference $\delta$ at a grating period X, and assuming the width of the aforesaid phase-difference defining portion being 'a', then the spacing between the phase-difference defining portions 8 will be X-a.

In the embodiment as shown in FIG. 5(A), there is shown such a grating with the base plate 7 and the phase difference defining portions 8 made from the same material. However, different materials may be used for such components, as far as they are transparent and may produce a phase difference $\delta$. For instance, the phase difference defining portions 8 may be made of glass on which magnesium fluoride is vacuum-evaporated and deposited. Furthermore, the base plate may be a lens surface used in the camera lens system.

Assuming that the aforesaid rectangular wave phase grating is incorporated on the pupil plane of a lens in the camera lens system and that the lens in the camera lens system has no aberration and the width of the phase grating is infinite, then, the intensity of the spread function on the focal plane of a lens system may be expressed as the square of the Fourier co-efficient, as follows:

$$In = \left(\frac{\sin n\pi}{n\pi} - \frac{\sin n\pi \frac{a}{x}}{n\pi}\right)^2 + \left(\frac{\sin n\pi \frac{a}{x}}{n\pi}\right)^2 + 2\cos\delta \left(\frac{\sin n\pi}{n\pi} - \frac{\sin n\pi \frac{a}{x}}{n\pi}\right) \left(\frac{\sin n\pi \frac{a}{x}}{n\pi}\right) \quad (1)$$

wherein $n = 0, \pm 1, \pm 2$.

In other words, the spread function presents an image spread linearly depending on the 'n' values, and the extent of the spread image is governed by the frequency period X, of the phase grating. Assuming that the focal length of the lens system is 'f', the wave length of the light from an object is $\lambda$ and the coordinate on the image surface 'U', then the aforesaid extent covers the position spaced, the following distance from the geometrical optical image point express as n=0, as follows:

$$U = nf \sim \lambda/x \quad (2)$$

and the extent of the spread has no bearing on the aperture ratio of the image focussing lens system.

Provided that the intensity distribution is such as expressed in the formula (1), then the response thereto will be such as shown in FIG. 4, such that the intensity distribution presents discontinued values, thereby resulting in higher response values in the high frequency range. The response as a low-pass filter should be '0' at a frequency higher than a given cut-off frequency, whereas the response P at the cut-off frequency Sc is not '0'. However, if such a value P is substantially small, then the object of the low-pass filter is achieved.

The cut-off frequency Sc is expressed as follows:

$$Sc = a/f \cdot \lambda \qquad (3)$$

The above relationship may be achieved by determining the width 'a' of the phase-difference defining portions 8 for obtaining the desired cut-off frequency based on the focal length 'f' of the image focussing lens and the wave length λ of the light.

The response P at the cut-off frequency Sc is expressed as follows:

$$P = 1 - 2 \; \frac{a}{(x)} \; (1 - \cos\delta) \qquad (4)$$

Accordingly, the response P is determined by the phase difference δ, the width 'a' of the phase difference-defining portions 8 and the frequency (X).

The frequency Sp shown in FIG. 4 is expressed as follows:

$$Sp = \frac{x}{f \lambda}.$$

The response at the frequency Sp is assumed to have the value '1', provided that the spread of the grating is infinitely great. In contrast thereto, in case the spread of the phase grating is finite, then the intensity distribution will have a width to some extent commensurate to $n = 0, \pm 1,$ and $\pm 2$. This signifies that, from the viewpoint of the response, the peak of the response at the frequency Sp in FIG. 4 is lowered below the value 1, while the decrease in the value of the response in the neighborhood of the frequency Sp may present preferable conditions for the phase grating in using the same as a low-pass filter. However, the fact still remains that there is left some degree of response in the vicinity (A) of the frequency Sp, and thus it is desired that such frequency be eliminated.

While the aforesaid description has been given to the case where the rectangular wave phase grating is provided on the pupil plane of a lens, such a grating is not necessarily located on the pupil plane. For instance, in case such a grating is inserted between the image focussing lens system and the image surface, then the width 'a' of the phase difference defining portions 8 and the period X of the phase grating may be relatedly varied commensurate to the ratio of the aperture of the lens to the diameter of a beam, i.e., the ratio of the focal length to the distance of the position of the phase grating to the image point, whereby the limitation of the phase grating position of the phase grating may be eliminated.

For the simplicity of the description, there has been referred thus far to a linear rectangular phase grating having an orientation characteristic. However, such a grating need not necessarily be a rectangular wave phase grating and may be of the type of a trapezoid wave or a sine wave. In addition, in case the stripe filter is of a mosaic type and bi-dimensional, then the phase grating may be one which has an orientation characteristic having a concentric pattern or phase plates of concentric elliptical shape having the same eccentricity.

As shown in FIG. 5 (B), a phase plate 6' may be used, in which the phase difference defining portions 8' having a phase difference δ and provided on the base plate 7' are in the shape of transparent small circles, and the transparent small circle portions 8' may be arranged on the base plate 7', with the spacing Y and Z being provided so as to give the orientation characteristics in 'Y' and 'Z' directions.

The following description is given by way of an example of a specific of the present invention by setting forth actual figures or values, with respect to the construction and functions thereof. For developing a chrominance signal of 0.75 MH$_z$ required normally in the case of the use of a 1 inch video tube or condensor 10, the stripe filter 1 as shown in FIG. 1, is provided with eighty sets of stripes such as red (R), green (G) and blue (B). In this case, the width of one set of stripes will be about 160 μ on the photoelectric converting surface 11. As a result, the number of the stripes per width of 1 mm will be $1/0.16 = 6.25$ /mm, such that the stripe pattern of an image from an object having a frequency higher than the aforesaid frequency is sharply attenuated or blocked.

In contrast thereto, in focussing the stripes of the stripe filter 1 on the photoelectric converting surface 11 through the lenticular lens member as shown in FIG. 2, the pitch of the parallel convex lens ridges 3 is 80 μ the focal length is 88 μ and the optical body 2 having this lenticular lens surface is inserted at a distance 'd' = 18 mm from the photoelectric converting surface 11, then the characteristics as a low-pass filter of the optical body 2 is shown by the solid line 'p' in FIG. 7, with the response being plotted as ordinate and with the frequency (each/mm) being plotted as an abscissa. As is clear from FIG. 7, the optical body 2 having such a lenticular lens surface blocks only 9 /mm on the lower frequency side, and the response value having a frequency higher than 9 each/mm exhibits minus values.

Thus, the use of the optical body 2 alone fails to provide the functions required of a low-pass filter, and it results in an inverse false signal at a frequency higher than 9 each/mm.

According to the system of the present invention, there is provided an optical filter in the form of phase grating 6 and 6' as shown in FIGS. 5(A) and (B) which is positioned in a manner that it will not exert any influence on image-focussing by the lenticular optical body 2 of the color stripe filter 1. More particularly, a rectangular wave phase grating, trapezoid wave phase grating or sine curve type phase grating is inserted on the object side of the stripe filter 1 in the camera lens system provided for obtaining chrominance signals.

Cooperating with the condition of the stripe filter 1, the phase grating 6 is so designed as to give the cut-off frequency $Sc = 8.0$/mm and $p=-0.12$, and such phase grating is positioned on the object side in the aforesaid position with $d = 18$ mm, and the stripe filter being superposed thereon. In this respect, assuming the wave length of the light of 500 mμ then there will be obtained $a=72\mu$. If $X = 3a$, then $X = 216\mu$. The phase difference δ is then obtained from the formula (4) in terms of $p=-0.12$, as follows:

$$\delta = 0.738 \; \pi$$

The characteristics of the phase plate 6 thus designed is such as shown by the broken line 'q' in FIG. 7, in which the response value begins to increase from the space frequency of 17/mm, reaching at a peak in the neighborhood of the space frequency of 24 each/mm as shown at 'A' in FIG. 7, said peak being about 0.7. This means that the use of the phase plate 6 alone cannot present a complete optical filter for the aforesaid stripe filter 1.

To remedy the situation, according to the present invention, there is provided, as shown in FIG. 8, the combination of the lenticular lens member 2 with the phase plate 6 which are incorporated in the camera lens system having a stripe filter 1. Then, the overall characteristics of the lenticular lens member 2 and the phase plate 6 will be such as given by the curve shown by the one-point chain line r in FIG. 7, while the cut-off frequency will be about 6.5 each/mm and the response P will be almost O, and in addition, the response on the frequency side higher than the aforesaid frequency will be maintained a almost zero.

This provides ideal characteristics as a low-pass filter for the light from an object, for use with the stripe filter 1.

In practice, the response in the frequency range to be cut off should fall in the range of ± 0.3, and thus the color shading may be prevented, although the response should approximate zero as shown in FIG. 7, in case the object is dark.

As is apparent from the foregoing, according to the present invention, there is provided a combination of a phase grating with a lenticular lens member arranged so as to give orientation characteristics, in the camera lens system having a stripe filter in a single or double tube color television camera system, whereby the image of the stripe filter is focussed on the photoelectric converting surface of the image tube by means of the optical body having the aforesaid lenticular lens arrangement and whereby the overall characteristics of the response to the space frequency, of the phase grating and the optical body having said lenticular lens may cut the high frequency over the space frequency of the aforesaid stripe filter among the stripe patterns included in the light from the object. This effects the elimination of interference between the stripe pattern of the object and the stripe filter, thereby preventing the color shading caused by the aforesaid interference, particularly preventing the development of the color shading in the case of the object being dark. Furthermore, since the overall characteristics as an optical filter may be obtained as a product of the optical body defining the respective lenticular lens member and the phase grating, there are obtained excellent characteristics, even if the optical filter is inferior in characteristic, due to manufacturing errors of the respective lenticular lens member or the phase grating. This further leads to the successful practical simple mass production of the optical body having a lenticular lens and phase grating sections.

While there have been described and illustrated preferred embodiments of the present invention, it is apparent that numerous alterations, omissions and additions may be made without departing from the spirit thereof.

We claim:

1. In a color television camera system including a photoelectric converting face, an optical system for forming a color modulated image on said photoelectric converting face comprising:
   an objective lens disposed in front of said photoelectric converting face so as to focus an image of an object thereon;
   a color encoding filter disposed between said objective lens and said photoelectric converting face, said color encoding filter having a plurality of parallel color stripes;
   a lenticular lens member disposed between said color encoding filter and said photoelectric converting face, said lenticular lens member having a plurality of side by side longitudinally extending cylindrical lenses parallel with said color stripes and being so located that an image of each color stripe is individually focussed on said photoelectric converting face by a corresponding one of said cylindrical lenses, respectively; and
   a phase grating disposed in front of said color encoding filter having a transparent substrate and transversely spaced phase retarding, lontiguidnal, transparent stripes disposed on a face of said substrate, said transparent stripes being parallel with said color stripes.

2. In a color television camera system including a photoelectric converting face, an optical system for forming a color modulated image on said photoelectric converting face comprising:
   an objective lens disposed in front of said photoelectric converting face so as to focus an image of an object thereon;
   a color encoding filter disposed between said objective lens and said photoelectric converting face, said color encoding filter having a plurality of parallel color stripes;
   a lenticular lens member disposed between said color encoding filter and said photoelectric converting face, said lenticular lens member having a plurality of side by side longitudinally extending cylindrical lenses parallel with said color stripes and being so located that an image of each color stripe is individually focussed on said photoelectric converting face by a corresponding one of said cylindrical lenses, respectively; and
   a phase grating disposed in front of said color encoding filter having a transparent substrate and a plurality of regularly arranged transversely and longitudinally spaced phase retarding transparent projections disposed on a face of said substrate, one of the directions determined by said regularly arranged projections being parallel with said color stripes.

* * * * *